Mar. 6, 1923.
M. C. CHAGNON.
EMERGENCY WHEEL.
FILED NOV. 7, 1921.
1,447,758.
2 SHEETS—SHEET 1.
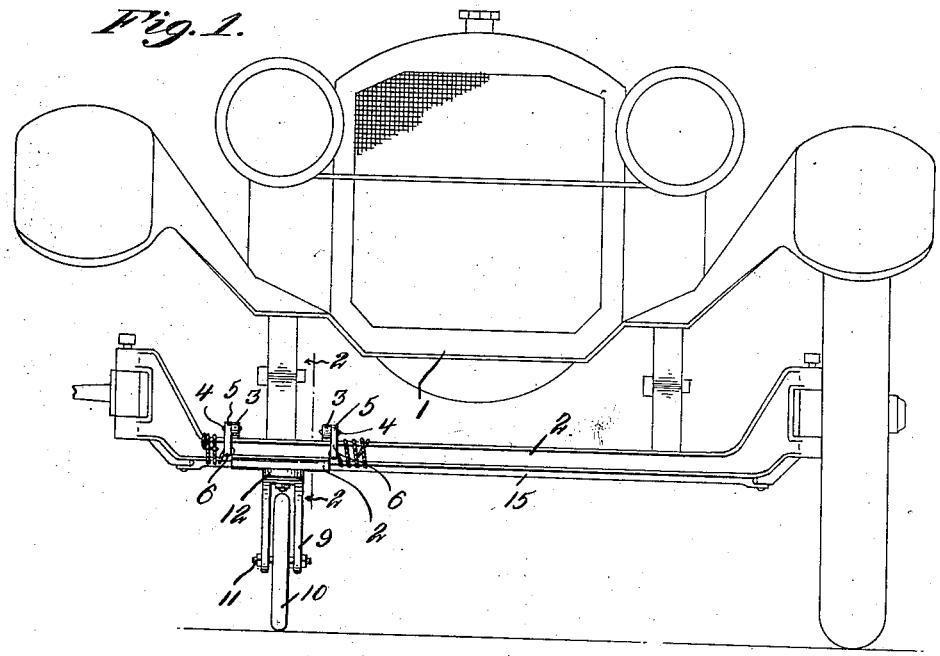
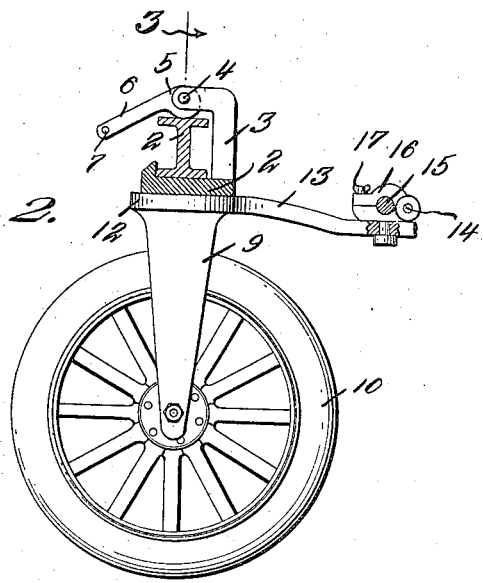
Moise C. Chagnon
INVENTOR
BY Victor J. Evans
ATTORNEY
WITNESS:

Mar. 6, 1923.
M. C. CHAGNON.
EMERGENCY WHEEL.
FILED NOV. 7, 1921.
1,447,758.
2 SHEETS—SHEET 2.
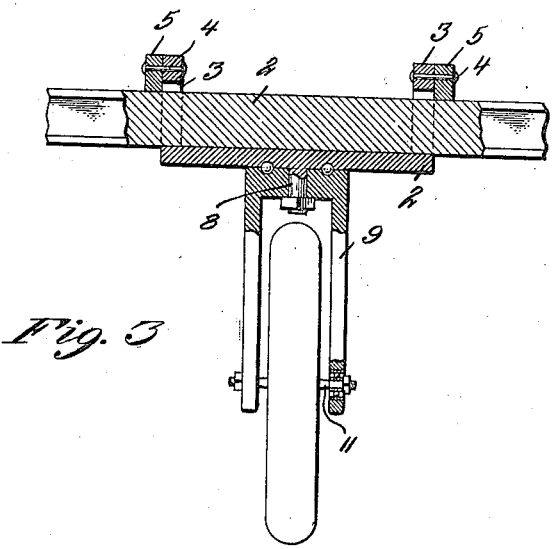
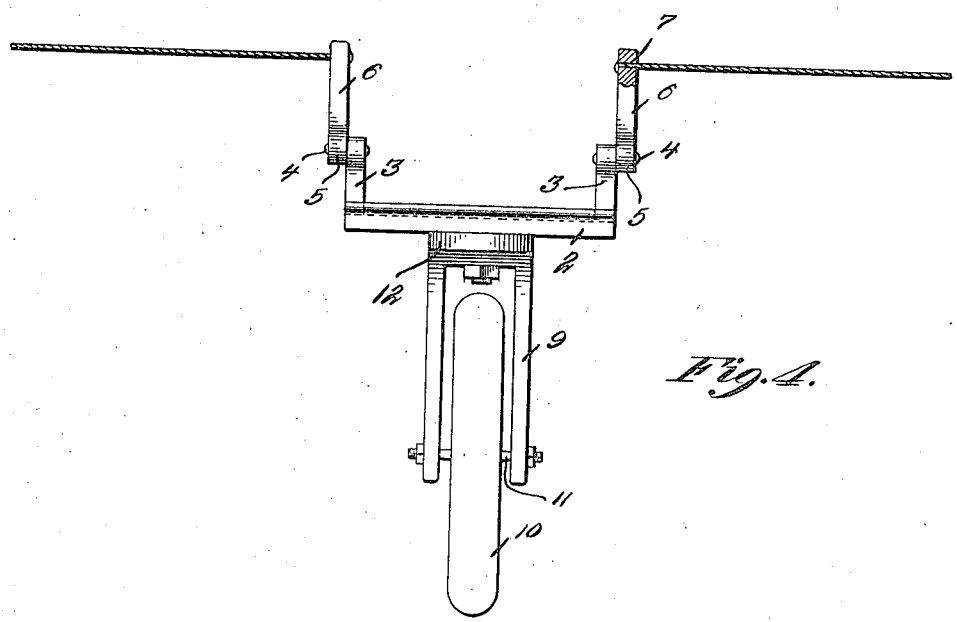

Patented Mar. 6, 1923.

1,447,758

UNITED STATES PATENT OFFICE.

MOISE CHARLES CHAGNON, OF DERBY, CONNECTICUT.

EMERGENCY WHEEL.

Application filed November 7, 1921. Serial No. 513,436.

*To all whom it may concern:*

Be it known that I, MOISE C. CHAGNON, a citizen of the United States, residing at Derby, in the county of New Haven and State of Connecticut, have invented new and useful Improvements in Emergency Wheels, of which the following is a specification.

My present invention has reference to an emergency wheel for automobiles.

My object is to produce an emergency wheel which shall be of a size that can be conveniently carried in the automobile when not required for use, and which can be expeditiously attached to the axle, in event of the breakage of a wheel carrying shaft and hitched to the steering connecting rod so that the vehicle can be propelled by its own power to a service station for repairs without requiring the owner to leave his machine on the road and subject the same to the stealth of parts therefrom.

The drawings illustrate a satisfactory embodiment of the improvement reduced to practice, and wherein:—

Figure 1 is a front elevation of an automobile showing the application of the improvement.

Figure 2 is a sectional view on the line 2—2 of Figure 1.

Figure 3 is a sectional view on the line 3—3 of Figure 2.

Figure 4 is a view of the improvement per se.

As disclosed by the drawings, the emergency wheel is comparatively small, and as the fork therefor may be removed from the bolster, these parts can be readily stored in the automobile or, if desired, attached to the side or rear thereof.

In the event of the breakage of any of the wheel carrying shafts, the improvement can be readily secured to the axle. In the showing of the drawings, I have illustrated the improvement as attached to the front axle.

In the said drawings, the numeral 1 designates broadly an automobile of any ordinary construction, and 2 the front axle thereof. We will suppose that the spindle or axle shaft for one of the wheels has been broken, and therefore only one of the front wheels is illustrated by the drawings.

My improvement contemplates the employment of a plate, which, if desired, may be in the nature of a channeled member and is indicated by the numeral 2. The plate, in reality comprises a bolster and is designed to be arranged upon the under face of the axle 2 near the broken end thereof. The bolster has thereon clamping means for locking the same to the axle 2, the said clamping means preferably comprising yokes 3 that straddle the axle 2 and that have pivoted to the connecting element for the parallel arms thereof, as at 4, cams 5, each of the said cams having an operating handle 6, and the operating handle may be provided with an opening 7 whereby to receive the flexible element that may be also passed around the axle and bolster for holding the cams in engagement with the upper face of the axle.

Removably pivoted, by means 8 to the under face and to the center of the bolster 2 there is a fork 9. Between the arms of this fork there is arranged the auxiliary wheel 10, the shaft 11 of the said auxiliary wheel finding bearings in openings in the arms of the yoke.

One the head 12 of the yoke 9 there is an outwardly extending lug 13 which has its upper face, at its outer end formed with a concavity providing the said end with a lipped lug 14, and in this lipped lug the steering connecting rod 15 is received. On the lug there is a clamping member 16 adjustable with respect to the lipped lug 14 by means 17, and in this manner it will be noted that the wheel carrying fork can be easily and quickly attached to the steering connecting rod so that the auxiliary wheel can be turned by the steering means in unison with the unbroken wheel of the automobile.

It is thought that the foregoing description, when taken in connection with the drawings will fully set forth the construction and advantages of the improvement and that further detailed description will not be required. It is also thought necessary to state that the nature of the invention is such as to render the same susceptible to such changes and modifications as fall within the scope of what is claimed.

It is thought necessary to state that my improvement may be employed for running a car to the nearest garage or service station where proper repairs can be made.

Having described the invention, I claim:—

In combination with an automobile, of an emergency wheel therefor, comprising a channelled plated designed to be arranged upon the under face of the axle of the automobile, a pair of parallel arms rising from said plate and being spaced from the upper face of the axle, a cam pivotally secured to each arm and adapted to be operatively associated with said axle, a handle formed on each cam to facilitate its operation, flexible means adapted to be secured to said axle and handle respectively to hold said cams in operative position through the medium of the handles, a fork depending from the channelled plate and being pivotally secured thereto, a wheel carried by the fork and means extending from said fork to adjustably secure the said fork to the steering connecting rod of the automobile as and for the purpose specified.

In testimony whereof I affix my signature.

MOISE CHARLES CHAGNON.